March 9, 1954  K. J. WELLS  2,671,363
ELECTRICALLY-CONTROLLED CABLE STRIPPING MACHINE
Filed Aug. 28, 1950  2 Sheets-Sheet 1

Inventor:
Kenneth J. Wells,
by Ernest C. Britton
His Attorney.

Patented Mar. 9, 1954

2,671,363

UNITED STATES PATENT OFFICE 2,671,363

ELECTRICALLY-CONTROLLED CABLE STRIPPING MACHINE

Kenneth J. Wells, Pittsfield, Mass., assignor to General Electric Company, a corporation of New York Application August 28, 1950, Serial No. 181,792

7 Claims. (Cl. 81—9.51)

This invention relates to devices for removing insulation from electrical conductors, and more particularly to a device of this nature which is automatically controlled to prevent cutting any of the conductor surrounded by the insulation.

In the electrical industry, both in manufacturing and in installation work, there constantly arises the necessity of removing insulation from the ends of electrical conductors, in order that the conductors may be suitably connected to utilization devices. When insulation is stripped from conductors by manual methods, the process is tedious and time-consuming. Furthermore, even if the insulation is stripped from the conductors by means of stripping machines of the type heretofore in use, unsatisfactory results are often obtained due to the fact that cable stripping devices in accordance with the prior art have frequently been inaccurate with the result that a portion of the conducting material is cut away along with the insulation.

It can be seen, therefore, that a cable stripping machine which will automatically strip insulation from a conductor without danger of cutting into the conducting material would be of great benefit to the electrical industry.

It is an object of my invention, therefore, to provide a new and improved insulation stripping machine which will efficiently remove insulation from an electrical conductor without removing any of the conducting material surrounded by the insulation.

It is a further object of my invention to provide a new and improved insulation stripping machine in which the stripping operation is automatically discontinued instantaneously when a predetermined amount of insulation has been stripped from the conductor member.

It is a further object of my invention to provide an insulation stripping machine which is regulated by an electrical circuit in such manner that the stripping mechanism is retracted instantaneously when a predetermined amount of insulation has been removed.

In accordance with these objectives, my invention provides a cable stripping machine in which the cutting knives which strip the insulation complete an electrical circuit as soon as they touch the conducting member, with the result that the cutting mechanism is instantaneously retracted from cutting engagement.

Figure 1:
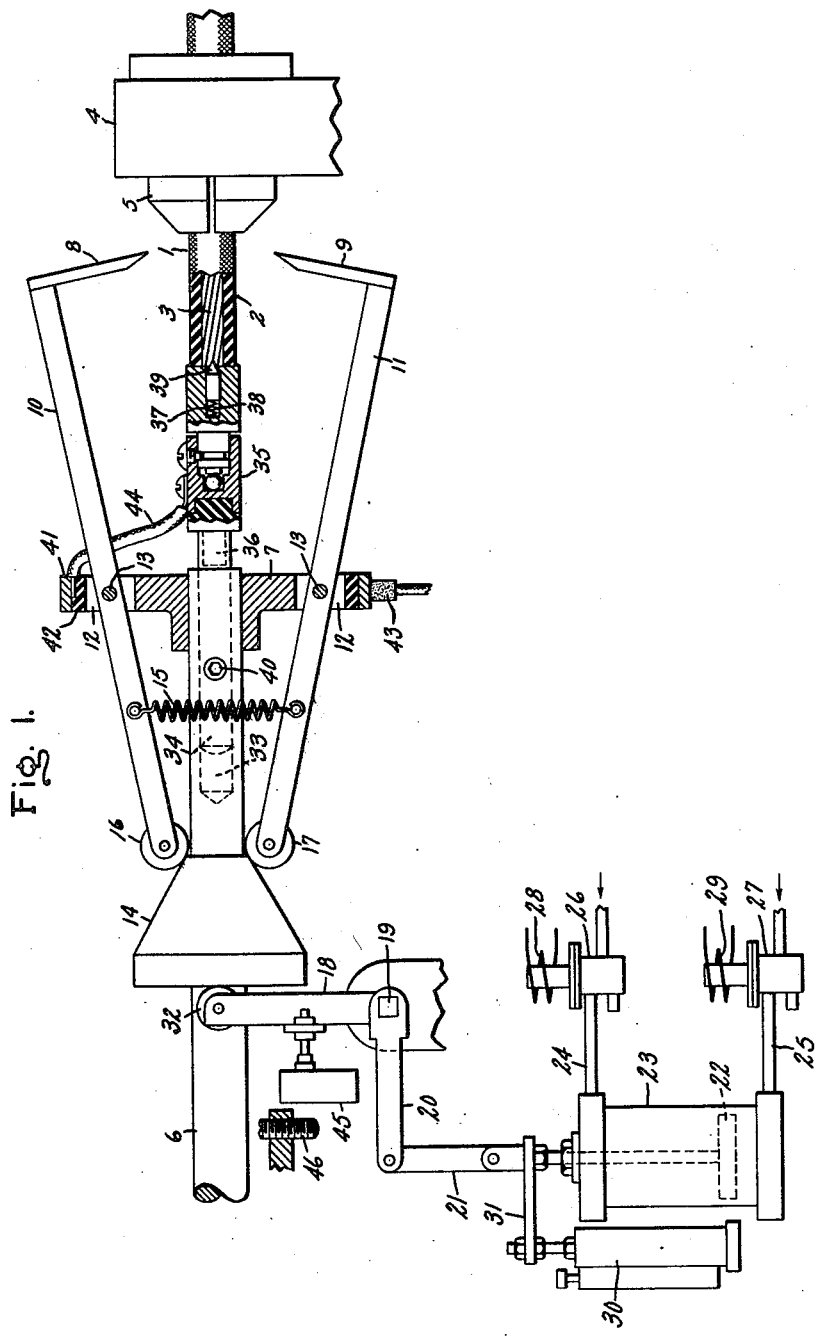
Figure 2:
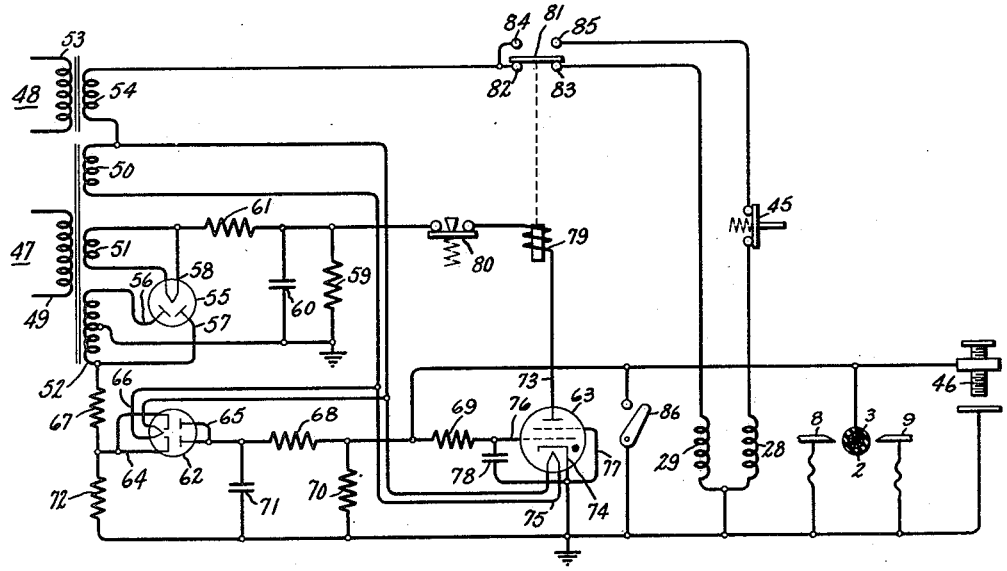

The features of this invention which I believe to be novel are set forth with particularity in the appended claims. My invention itself, however, both as to its organization and use, together with further objects and advantages thereof, may best be understood by reference to the following description taken in connection with the accompanying drawing in which Fig. 1 is a view of a cable stripping mechanism in accordance with my invention; while Fig. 2 is a wiring diagram of an electrical control circuit which may be used in connection with the cable stripping machine of Fig. 1.

Referring now to the drawing, there is shown a cable 1 having a covering of insulation 2 and a center conductor member 3. The cable 1 is held in position by a collet 4 having a plurality of jaw members 5 which grip the cable and hold it rigidly in position. The collet 4 may be of any suitable type, and forms no part of this invention. It may be manually tightened or it may be actuated by air or liquid pressure, if desired. A portion of the cable 1 protrudes through the jaws 5 of the collet 4, this portion of the cable having the end from which the insulation is to be stripped.

The cable stripping device, which will be described hereinafter in more detail, rotates with a shaft 6, which may be driven by any suitable power device, such as, for example, an electric motor.

A collar 7 is keyed or otherwise rigidly attached to shaft 6 and rotates therewith. A pair of cutting knives 8 and 9 are respectively mounted at the ends of lever members 10 and 11, which are pivotally mounted with respect to collar member 7. Collar member 7 is provided with two apertures 12 at diametrically opposite positions, and lever members 10 and 11 each respectively pass through one of the apertures 12, each lever member being pivotally connected to the collar member 7 by means of a pin 13.

A cone-shaped member 14 is slidably mounted on shaft 6, the apex of the cone shape being directed toward the lever members 10 and 11. A spring 15 is connected between two corresponding points on lever members 10 and 11 respectively, on an opposite side of pivot pins 13 than the cutting knives 8 and 9, to normally maintain the cutting knives 8 and 9 out of cutting engagement with the cable 1. The ends of lever members 10 and 11 are each respectively provided with roller members 16 and 17 for engagement with the surface of cone 14, as will be hereinafter described in more detail.

When cone 14 is caused to move axially along shaft 6, lever members 10 and 11 are caused to pivot about pins 13, with the result that cutting knives 8 and 9 which are attached to levers 10 and 11 are caused to move into contacting relation with the insulating material which is to be cut.

Axial motion of cone 14 is caused by its engagement with crank member 18. Crank 18 is rigidly attached to one end of a shaft 19, the other end of the shaft 19 being rigidly attached to a second crank member 20 at right angles to crank 18. Crank 20 is pivotally connected to a connecting rod 21 attached to a piston 22 inside of a cylinder 23. Piston 22 is caused to move in cylinder 23 by air pressure admitted to the cylinder through conduits 24 and 25, respectively. Valves 26 and 27 are provided in air supply conduits 24 and 25, respectively, valves 26 and 27 being respectively controlled by electrical solenoids 28 and 29. When solenoid 28 is energized, as will be hereinafter described, valve 26 is actuated to admit air through conduit 24 to cylinder 23, thereby causing a downward motion of piston 22, with respect to the view shown in the drawing. When solenoid 29 is energized, valve 27 is actuated in such manner as to admit air through inlet conduit 25 to cylinder 23 thereby causing a motion of piston 22 in an upward direction, with respect to the view shown in the drawing. In order to provide a cushioning effect on the action of the air cylinder when the piston 22 moves in an upward direction, with respect to the view shown in the drawing, a hydraulic dashpot device 30 is provided adjacent air cylinder 23. The dashpot piston is mechanically connected to connecting arm 21 by an arm 31. The dashpot 30 provides a damping action in one direction only, namely, as will be explained hereinafter, the direction in which the cutting knives 8 and 9 are being fed into the insulation.

It can be seen that when piston 22 moves upwardly in air cylinder 23 due to admission of air through conduit 25, connecting rod 21 also moves upwardly, causing crank 20 to move in a clockwise direction. This motion of crank 20 causes shaft 19, to which crank 20 is rigidly connected, to move in a clockwise direction also, carrying with it crank 18. Motion of crank 18 in a clockwise direction with respect to the view shown in the drawing causes the roller 32 at the end of crank 18 to abut against the surface of cone 14, causing cone 14 to slide axially along rotating shaft 6. Motion of cone 14 axially toward the cable causes levers 10 and 11 to pivot about pins 13, as has been hereinbefore described, with the result that rotating cutting knives 8 and 9 contact the insulating material and begin to strip the insulating material from the conductor.

In order to provide electrical contact between the end of the rotating mechanism and the cable, and in order to provide mechanical support for the free end of cable 1 which is having its insulation stripped off, an assembly is provided at the end of shaft 6, which will now be described.

The outer end of shaft 6 toward the cable is provided with a recessed portion 33. A pin 34, having a diameter slightly less than recess 33 to provide for easy axial movement of pin 34, is adapted to be positioned in recess 33. Metal bushing 35 is insulatingly connected to pin 34 by an insulating pin member 36 which fits into a recess in the outer end of pin 34, insulating pin member 36 being provided at its other end with an enlarged head portion which is adapted to fit into a mating recess in bushing member 35. Thus, bushing 35 is insulatingly connected to pin 34, with insulating pin 36 serving to insulate metallic bushing 35 from the shaft 6 and collar member 7. The bushing 35 is provided at its end adjacent the cable with a recess 37 containing a spring 38 and a spring-biased contact point 39. Contact point 39 establishes electrical contact between metallic bushing 35 and the conductor 3 of cable 1, spring 38 maintaining contact point 39 in engagement with conductor 3.

A set screw 40 is provided on shaft 6 adjacent the interior recess 33 to permit tightening pin 34 to any desired position within the recess 33. This provides a means by which the length of pin 34 projecting into recess 33 can be adjusted as desired in order to adjust the length of the cable 1 which projects beyond the collet 4, thereby regulating the amount of insulation which is stripped off the cable.

Collar 7 is provided with a conducting ring 41 on its radially outer edge, ring 41 being separated from the main body of collar 7 by a circumferential insulating strip 42 positioned radially inwardly of conducting strip 41. A collector brush 43 bears against conducting strip 41, with brush 43 being connected to the grid of a thyratron control tube, as will be explained hereinafter. Conducting strip 41 is conducted by an electrical lead 44 to metal bushing member 35, which is connected through contact point 39 to conductor 3 of cable 1. Thus, when contact point 39 is in contacting relation with conductor 3 of cable 1 as shown in the drawing, conductor 3 is conductively connected through lead 44 and contact strip 41 to the grid of a thyratron control tube, as will be explained in more detail hereinafter. The metal knives 8 and 9 are connected to ground through the frame of the machine. It can be seen, therefore, that when the cutting knives 8 and 9 contact the conductor 3, the conductor 3 will then be grounded, and, as will be more fully explained hereinafter, the grid of a thyratron gas control tube which controls the motion of cone 14, is likewise placed at ground potential. Thus, it can be seen that the cutting knives 8 and 9 operate as a switch to energize an electrical circuit which controls the operation of cone 14 in such manner that cone 14 is retracted instantaneously when cutting knives 8 and 9 contact conductor 3.

There are also shown in Fig. 1 two auxiliary switch devices which are mounted adjacent the linkage system which operates cone 14. These switch devices include a switch 45 positioned adjacent crank arm 18, switch 45 being caused to open when cutting knives 8 and 9 separate, and an adjustable stop or limit switch 46 positioned adjacent crank arm 20. When crank arm 18 moves in a counterclockwise direction due to a downward motion of piston 22 in cylinder 23 concurrently with the separation of the knife blades 8 and 9, switch 45, which may be a microswitch, is caused to open. Similarly, when crank arm 20 moves in a clockwise direction upwardly to a predetermined point, it will abut against adjustable stop 46 and accomplish the same electrical purpose as is accomplished when knife blades 8 and 9 contact copper conductor 3; namely, solenoid 28 will be energized in such manner as to cause a downward motion of piston 22. Thus, adjustable stop 46 functions as a limit switch to prevent overtravel of the cutting knives 8 and 9. The adjustable stop may be adjusted in accordance with the thickness of insulation being stripped at any particular time. The electrical functions of switch 45 and adjustable stop 46 will be described hereinafter more completely in connection with a discussion of the electrical wiring diagram described in connection with Fig. 2.

Referring now to Fig. 2, there is shown a circuit diagram of an electrical control system which may be used with my automatic cable stripping machine. There are shown two transformers 47 and 48. Transformer 47 has a primary winding 49 and three secondary sections 50, 51 and 52. Transformer 48 has a primary winding 53 and a secondary winding 54. A full-wave rectifier tube 55 has its two anodes 56 and 57, respectively, connected to opposite ends of transformer secondary 52. The filament of cathode 58 of tube 55 is energized by secondary transformer winding 51. Cathode 58 is connected to the grounded mid-point of secondary winding 52 through a series resistance 61 and a parallel resistance-capacitance filter comprising resistance 59 in parallel with capacitance 60.

Two other electronic tubes are employed in the circuit, including a double diode rectifier tube 62 and a thyratron gas-filled tube 63. As will be more fully explained hereinafter, thyratron gas tube 63 operates relay devices which control solenoids 28 and 29. The function of double diode rectifier tube 62 is to provide a suitable grid bias for the grid of thyratron gas-filled tube 63.

Double diode rectifier tube 62 is provided with a double cathode 64, a double anode 65 and a heater filament 66 for cathode 64. Filament 66 is energized from secondary winding 50 of transformer 47. Cathode 64 is connected to secondary winding 52 at the same end of the winding as the connection point of anode 57 of full-wave rectifier tube 55, through a resistance 67.

Diode 62 is conducting on the half cycle of applied voltage when the end of transformer secondary to which cathode 64 is connected through resistance 67 becomes negative. At this instant, ground is positive relative to cathode 64. Grid 76 of gas tube 63 is connected in the circuit of anode 65 between resistances 68 and 70, a point which is below ground potential. Since cathode 74 of tube 63 is at ground potential, it follows that grid 76 of gas tube 63 is maintained negative with respect to cathode 74 during the half cycle when tube 62 is conducting. Condenser 71 maintains grid 76 negative with respect to cathode 74 during the half cycle of applied voltage when tube 62 is not conducting. The amount of negative bias of grid 76 depends upon the relative values of load resistors 68 and 70.

The potential supplied to the anode circuit of diode rectifier tube 62 is equal to part of the potential between ground and the end of transformer secondary 52 to which resistance 67 is connected. The total potential between ground and the end of transformer secondary winding 52 is applied across the resistors 67 and 72 which act as a voltage divider. Since cathode 64 and ground are connected on opposite sides of resistor 72, the voltage drop across this resistor is equal to the voltage supplied to the anode circuit of tube 62.

Gas-filled tube 63 is provided with an anode 73, a cathode 74, a filament heater 75 for cathode 74, and a grid 76. Filament heater 75 is energized by transformer secondary 50. A screen grid 77 connected to ground may also be used if desired. A by-pass condenser 78 is connected between grid 76 and ground. A current-limiting resistor 69 is placed in series with grid 76 of tube 63 in accordance with conventional practice.

Anode 73 of thyratron tube 63 derives its potential with respect to cathode 74 from the voltage drop across resistance-capacitance coupling 59—60 in the output circuit of rectifier tube 55. A relay coil 79 is provided in series with anode 73, and a manually operated switch 80 is also provided in series with the relay coil 79 and anode 73, for a purpose to be explained hereinafter. Relay 79 controls a contact arm 81 which bridges contacts 82 and 83 when relay 79 is not energized and bridges contacts 84 and 85 when relay 79 is energized. When contact arm 81 is in the position where it bridges contacts 82 and 83, it energizes close solenoid 29, and when contact arm 81 is in the position where it bridges contacts 84 and 85, it energizes release solenoid 28.

The operation of the cable stripping machine of my invention will now be described in terms of the mechanical structure shown in Fig. 1 and the electrical wiring diagram shown in Fig. 2. When the input transformers 47 and 48 are energized, rectifier tube 55 produces a full-wave rectified voltage across load resistor 59. Anode 73 of gas-filled thyratron tube 63 is connected across one side of load resistor 59, with the other side of the load resistor being connected to the grounded mid-point of transformer secondary 52. The cathode 74 of thyratron gas-filled tube 63 is connected to ground. Hence, the difference of potential between anode 73 and cathode 74 of gas-filled tube 63 is equal to the potential drop across resistor 59 in the output circuit of rectifier tube 55. Grid 76 of thyratron gas-filled tube 63 derives a negative bias with respect to cathode 74 of that tube due to the relative positions at which these two elements are connected with respect to the anode circuit of diode rectifier tube 62, as has been previously explained.

When it is desired to begin cable stripping operations, transformers 47 and 48 are energized, thereby energizing full-wave rectifier tube 55, half-wave diode rectifier tube 62, and thyratron gas-filled tube 63. On this initial energization, grid 76 of gas-filled thyratron tube 63 will be at a negative potential with respect to cathode 74, while anode 73 will be constantly at a positive potential with respect to cathode 74. Due to the negative bias on grid 76, there will be no conduction in the circuit of anode 73, so that relay 79 will be unenergized and relay contact arm 81 will be in a position where it bridges contacts 82 and 83 to complete the circuit of close solenoid 29.

Energization of solenoid 29 actuates valve 27 to admit air to cylinder 23, thereby causing an upward motion of piston 22, with respect to the view shown in the drawing in Fig. 1. Upward motion of piston 22 causes upward motion of connecting rod 21 and a clockwise motion of crank arm 20 which is pivotally connected to connecting rod 21. Clockwise motion of crank arm 20 is communicated through shaft 19 to crank arm 18, which also then has a clockwise motion. Clockwise motion of crank arm 18, with respect to the view shown in Fig. 1, causes the rollers 32 on the end of crank arm 18 to abut against cone 14 which is slidably mounted on shaft 6. Due to the motion of crank arm 18, cone 14 is caused to slide axially along shaft 6 to the right, with respect to the view shown in the drawing, thereby causing rollers 16 and 17 at the end of lever arms 10 and 11, respectively, to ride up on the surface of cone 14. As rollers 16 and 17 ride up on cone 14, levers 10 and 11 are caused to have a pivotal motion about their respective supporting pins 13, causing cutting knives 8 and 9, which are respectively attached to the ends of levers 10 and 11, to be forced into contacting and cutting relation with the insulation 2 of cable 1. Knives 8 and 9 rotate with shaft 6 and cut into the insulation 2 until the metal knives contact the center conductor member 3.

When knives 8 and 9 contact center conductor member 3, grid 76 of gas-filled thyratron tube 63 is grounded instantaneously since, as has been previously explained, the center conductor member 3 is connected to the grid 76 through contact point 39, metal bushing 35, lead 44, conducting ring 41, and brush 43, while the cutting knives 8 and 9 are connected through the collar 7 and shaft 6 to ground.

As soon as grid 76 is grounded due to the knives 8 and 9 contacting center conducting member 3, thyratron gas-filled tube 63 begins to conduct and relay 79 in the anode circuit of tube 63 is energized. Energization of relay 79 causes a motion of contact arm 81 so that it moves from the position where it bridges contacts 82 and 83 in the circuit of close solenoid 29, and instead bridges contacts 84 and 85 in the circuit of release solenoid 28. Energization of release solenoid 28 actuates valve 26 to admit air through conduit 24 to cylinder 23 in such manner as to cause a downward motion of piston 22 with respect to the view shown in the drawing. Downward motion of piston 22 causes a downward motion of connecting rod 21 and a counterclockwise motion of crank arms 20 and 18. Since crank arm 18 is then no longer bearing against cone 14 and is therefore no longer tending to maintain cone 14 in a position where rollers 16 and 17 are riding on the cone surface, spring 15 pulls levers 10 and 11 back together again in such manner that cone 14 is forced back to the position where rollers 16 and 17 are no longer riding on the cone surface. Cutting knives 8 and 9 are therefore retracted from cutting position.

As soon as lever 18 begins to move in a counterclockwise direction with the retraction of knives 8 and 9, switch 45 is actuated by the motion of crank arm 18, thereby opening the circuit of release solenoid 28. Thus, release solenoid 28 can only be actuated when crank arm 18 is in a position corresponding to the cutting position of knives 8 and 9. As soon as the knives separate, switch 45 is opened and thereby the circuit of release solenoid 28 is opened.

Also, as has been previously explained, a stop 46 is provided adjacent crank arm 20 so that if crank arm 20 moves too far in a clockwise direction, it will abut against stop member 46 and ground grid 76 of thyratron gas-filled tube 63. Stop member 46 is connected to the grid 76, and crank arm 20 is connected to ground. Stop member 46 is therefore in effect a limit switch to prevent over-travel of crank arm 20. Normally, of course, cutting knives 8 and 9 will contact conductor member 3 and ground grid 76 before crank arm 20 is able to come in contacting relation with stop member 46. Stop member 46 is adjustable and may be adjusted in accordance with the thickness of the insulation which is being stripped.

A further feature is the provision of a manual switch 86 which permits manual grounding of grid 76, to thereby permit manual operation of a switch for actuating release valve 28, rather than depending upon the operation of the cutting knives 8 and 9 to effect grounding of grid 76. Thus, if for any reason it is desired to retract the cutting knives 8 and 9 before they have come in contact with conductor 3, switch 86 may be manually closed to ground grid 76, thus actuating solenoid 28 and causing retraction of knives 8 and 9, as has been previously explained.

After the release solenoid 28 has once been actuated due to grounding of grid 76, the circuit of anode 73 remains conducting until the anode potential is removed. As is well known, while removal of a negative grid bias will cause a thyratron gas tube to fire and cause conduction in the anode circuit, restoration of the same negative grid bias does not stop conduction in the anode circuit, and in order to stop anode conduction, it is necessary to open the anode circuit.

Hence, if it is desired to move the cutting knives 8 and 9 back into cutting position after they have been retracted, it is necessary to open the circuit of anode 73, which may be done by actuating switch 80 to an open position. This will cause relay 79 to be deenergized and will permit relay contact arm 81 to move to the position corresponding to the unenergized condition of relay 79, where contact arm 81 bridges contacts 82 and 83. This will close the circuit of close solenoid 29 and, as has been previously explained, will cause air to be admitted to cylinder 23, with the result that cone 14 will be moved to a position where cutting knives 8 and 9 are in a cutting position with respect to cable 1.

It can be seen that my invention provides a new and improved cutting mechanism for stripping insulation from an electrical cable. In accordance with my invention, the cutting knives which strip the insulation from the cable are automatically retracted into non-cutting position instantaneously when the cutting knives contact the center conductor of the cable which is being stripped. After the cutting knives cut through the insulation up to the electrical conductor, the insulation can be removed manually. The insulation can be cut through in several places to facilitate easy manual removal of the insulation. While I have shown an embodiment of my invention in which the cutting knives are actuated by a linkage system controlled by an air cylinder, it is obvious that other means could be provided to actuate the cutting mechanism. Furthermore, while I have shown an electronic circuit using a gas-filled thyratron tube for controlling the solenoids which, in turn, control the operating mechanism for actuating the cutting knives, it is obvious that other electrical circuits could be used to control the operating solenoids, and still be within the scope of my invention.

While there have been shown and described particular embodiments of my invention, it will be obvious to those skilled in the art that changes and modifications can be made without departing from the invention and, therefore, it is aimed in the appended claims to cover all such changes and modifications as fall within the true spirit and scope of the invention.

What I claim as new and desire to secure by Letters Patent of the United States is:

1. A device for stripping insulation from an electrical conductor comprising a rotatable shaft, a cutting device rotatable with said shaft, said cutting device being formed of an electrically conducting material, means for moving said cutting device into cutting engagement with the insulation of an electrical conductor, an electrically-controlled means for retracting said cutting device from cutting engagement substantially instantaneously when said cutting device contacts said conductor member, and an electrical circuit for actuating said electrically controlled means comprising said cutting device and said conductor whose insulation is being stripped.

2. A device for stripping insulation from an electrical conductor comprising a rotatable shaft, cutting means rotatable with said shaft, said cutting means being formed of an electrically conducting material, means for moving said cutting means into cutting engagement with said insulation, and electrically-controlled retracting means for retracting said cutting means from cutting engagement with said insulation when said cutting means contacts said conductor member, and an electrical circuit for actuating said electrically controlled retracting means, said electrical circuit comprising said cutting means and said conductor whose insulation is being stripped, said electrically-controlled retracting means being actuated when said electrical circuit is completed by said cutting means contacting said electrical conductor from which said insulation is being stripped.

3. In a machine for stripping insulation from a conductor having a rotatable shaft, cutting means mounted thereon and rotatable therewith, and actuating means for moving said cutting means into cutting engagement with the insulation of the conductor being disinsulated, electrical control means causing said actuating means to instantaneously release said cutting means from said cutting engagement upon contact of said cutting means with the conductor being disinsulated, and electrical circuit means for actuating said electrical control means comprising said conductor and said cutting means upon contact of said cutting means with said conductor.

4. A cable stripping machine for removing the insulation from a conductor comprising a rotatable shaft, cutting means mounted thereon, and means for moving said cutting means into cutting engagement with the insulation of the conductor being disinsulated, a collar for mounting said cutting means on said shaft, the outer periphery of said collar having an electrical contact surface insulated from said shaft, collar, and cutting means, electrical contact means insulatingly fixed on said shaft adapted to make electrical contact with the conductor being disinsulated, said contact means and said contact surface being electrically connected, electrically controlled retracting means for instantaneously retracting said cutting means from said cutting engagement upon contact of said cutting means with the conductor being disinsulated, electric control means for actuating said electrically controlled retracting means, and electric circuit means for actuating said electric control means comprising said collar contact surface, said conductor being disinsulated, and said cutting means upon contact of said cutting means with the conductor being disinsulated.

5. A machine for stripping insulation from a conductor comprising a rotatable shaft, a collar thereon, and cutting means mounted on said collar, said shaft, collar, and cutting means being constructed of electrical conducting material, an electrical contact bushing insulatingly fixed on said shaft adapted to make electrical contact with a conductor being disinsulated, an electric contact surface on said collar insulated from said shaft, collar, and cutting means and electrically connected to said contact bushing, a collector brush engaging said contact surface, means for moving said cutting means into cutting engagement with the insulation of a conductor being disinsulated, and electrically controlled means for instantaneously retracting said cutting means from said cutting engagement upon contact of said cutting means with the conductor being disinsulated, and circuit control means for said electrically controlled means comprising said collector brush, contact surface, bushing, conductor being disinsulated, cutting means, collar, and shaft upon contact of said cutting means with the conductor being disinsulated.

6. A machine for disinsulating a conductor comprising a rotatable shaft, cutting means rotatable therewith, and mounting means for mounting said cutting means on said shaft, said mounting means having a contact surface insulated from said cutting means and electrically connected to the conductor being disinsulated, said conductor being insulated from said shaft, contact means engaging said contact surface, electrically operated means for instantaneously retracting said cutting means from cutting engagement with the insulation of the conductor being disinsulated upon contact of said cutting means with said conductor, and electric circuit means for actuating said electrically operated means comprising said contact means, the conductor being disinsulated, and said cutting means upon engagement of said cutting means with said conductor.

7. A device for stripping insulation from a conductor comprising a rotatable shaft, cutting means mounted thereon and rotatable therewith, mounting means for mounting said cutting means on said shaft, said shaft, mounting means, and cutting means being constructed of electrically conductive material, contact means adapted to electrically contact the conductor being disinsulated insulatingly mounted on said shaft and electrically connected to a contact surface on said mounting means insulated from said cutting device, mounting means, and shaft, a contact means engaging said contact surface on said mounting means, solenoid operated means for instantaneously retracting said cutting means from cutting engagement with said insulation upon contact of said cutting means with the conductor being disinsulated, said solenoid operated retracting means being controlled by a thryratron tube circuit means comprising a thyratron tube and relay means, the control grid of said thyratron tube being electrically connected to said contact means engaging said mounting means contact surface, said thyratron tube being conductive and said relay means actuating said solenoid operated means when said cutting means contacts said conductor being disinsulated.

KENNETH J. WELLS.

References Cited in the file of this patent

UNITED STATES PATENTS

| Number | Name | Date |
|---|---|---|
| 1,433,320 | Wersel | Oct. 24, 1922 |
| 2,415,669 | Beuschel | Feb. 11, 1947 |

FOREIGN PATENTS

| Number | Country | Date |
|---|---|---|
| 557,307 | Great Britain | Nov. 15, 1943 |